United States Patent
Pihlaja et al.

(10) Patent No.: US 7,035,088 B2
(45) Date of Patent: Apr. 25, 2006

(54) POP-UP ELECTRONIC DEVICE WITH SLIDING PROTECTIVE WINDOW

(75) Inventors: Pekka Pihlaja, Helsinki (FI); Pentti Ahlgren, Helsinki (FI)

(73) Assignee: Nokia Corporation, Espoo (FI)

( * ) Notice: Subject to any disclaimer, the term of this patent is extended or adjusted under 35 U.S.C. 154(b) by 240 days.

(21) Appl. No.: 10/737,157

(22) Filed: Dec. 16, 2003

(65) Prior Publication Data

US 2005/0128686 A1   Jun. 16, 2005

(51) Int. Cl.
    *H05K 5/00*   (2006.01)
(52) U.S. Cl. .................................. 361/679; 361/681
(58) Field of Classification Search ......... 361/679–681
    See application file for complete search history.

(56) References Cited

U.S. PATENT DOCUMENTS

| | | | | |
|---|---|---|---|---|
| 6,647,249 | B1 * | 11/2003 | Crisp .................... | 455/575.4 |
| 6,744,624 | B1 * | 6/2004 | Siddiqui .................... | 361/683 |
| 6,950,516 | B1 * | 9/2005 | Pirila et al. ............ | 379/433.12 |
| 2002/0158812 | A1 | 10/2002 | Pallakoff .................... | 345/5 |
| 2003/0003878 | A1 | 1/2003 | Bestle .................... | 455/90 |

FOREIGN PATENT DOCUMENTS

GB   2 384 389 A   *   7/2003

OTHER PUBLICATIONS

Web page from www.nokia.com regarding Nokia 8910 phone support, publication date unknown.
Web page from www.nokia.com regarding Nokia 8910 phone features, publication date unknown.

* cited by examiner

*Primary Examiner*—Yean-Hsi Chang
(74) *Attorney, Agent, or Firm*—Ware, Fressola, Van Sluys & Adolphson LLP

(57) ABSTRACT

A pop-up electronic device has a keypad and display module arranged for slideable engagement with an outer cover wherein the keys of the keypad are nested within the outer cover in the device fully closed position and are exposed in the device fully open position. A protective window is in an overlapping relationship with the display in the device fully closed position and non-overlapping relationship with the display in the device fully open position to allow contact with and direct viewing of the display screen surface. The keypad and display module and protective window are mechanically arranged such that movement of the protective window in one direction causes the module to move in an opposite direction to change the electronic device between device fully open and fully closed positions.

32 Claims, 13 Drawing Sheets

POP-UP ELECTRONIC DEVICE WITH SLIDING PROTECTIVE WINDOW

TECHNICAL FIELD

The present invention relates generally to pop-up electronic devices and deals more particularly, though not necessarily, with pop-up mobile communication devices such as mobile phones.

BACKGROUND OF THE INVENTION

Pop-up electronic devices particularly mobile communications devices such as for example the Nokia mobile phone model 8910 available from Nokia Mobile Phones, the assignee of the present invention, generally comprise an outer cover or shell and a phone portion including the display, keypad and selection keys. The phone portion is mechanically arranged to slide into the outer cover or shell in the phone closed position such that the keypad and selection keys are covered and inaccessible for contact. Since the keypad and selection keys are not accessible when the phone is in the closed position, there is no need for awkward or complex key-press combinations to lock or unlock the keypad. The phone portion slides out of or pops-up to reveal the keypad and selection keys for contact and operation in the phone open position. In the phone open position, the outer cover or shell provides a good handgrip while using the keypad and selection keys to operate the phone.

One drawback and disadvantage of pop-up electronic devices such as pop-up mobile phones of the above described type is the screen surface display is always accessible for contact whether the phone is in the closed position or open position and therefore a protective window is required on the phone portion over the display to protect the screen surface display from contact with the cheek when the user operates the phone in the normal manner thus any oils, cosmetics, and the like are prevented from coming into contact with the display screen surface and are deposited on the protective window surface. The protective window presents an ergonomic problem because it is always on top of the display screen and thus the specular reflections created by it deteriorate the image quality of the display in the phone open position and the phone closed position.

A further disadvantage of pop-up electronic devices such as pop-up mobile phones of the above described type is a resistive touch screen display cannot be used with because the protective window prevents contact with the screen in the device open position and the device closed position. In general, a touchscreen placed on the protective window would create unacceptable optical parallax between the stylus tip and the display.

A yet further disadvantage of pop-up electronic devices such as pop-up mobile phones of the above described type is the mechanical arrangement to provide the phone portion movement out of and into the outer cover is complex and somewhat costly and may be subject to failure or unacceptable performance over a period of time.

Accordingly, it is an object of the present invention to provide a pop-up electronic device such as a pop-up mobile phone that overcomes the disadvantages of the known prior art pop-up electronic devices.

SUMMARY OF THE INVENTION

According to a first aspect of the invention, an electronic device such as a mobile communication device is provided and comprises an outer cover or shell and a keypad and display module arranged for slideable engagement with the outer cover along a longitudinal lengthwise axis of the cover. A protective window is disposed outermost of the keypad and display module and is also arranged for slideable engagement with the outer cover along the cover longitudinal lengthwise axis and over the keypad and display module surface. The keypad and display module and the protective window are further arranged for movement relative to one another and the outer cover along a rectilinear path coinciding with the cover longitudinal lengthwise axis. The keypad and display module and the protective window define a first operative device closed position wherein the protective window is in an overlapping relationship with the keypad and display module and a second operative device open position wherein the keypad and display module and the protective window are in a non-overlapping relationship with one another.

Preferably, in the first operative position the keypad portion of the keypad and display module nests within the outer cover such that the keys of the keypad are hidden and protected from contact and the display portion of the keypad and display module is enveloped by the protective window such that the screen surface of the display is viewable through the protective window and is protected from contact.

Preferably, in the second operative position the keypad portion of the keypad and display module is accessible for contact for operating the keys of the keypad.

Preferably, in the second operative position the protective window is located such that the screen surface of the display is exposed for direct viewing and contact.

Preferably, the protective window nests within the outer cover when it is in the second operative position.

Preferably, the protective window slides over an exterior surface portion of the outer cover.

Preferably, the outer cover further includes at least a portion of an exterior surface made of a stretchable material defining a pocket for receiving the protective window.

Preferably, the keypad and display module and the protective window are further arranged to move in unison, ie. contemporaneously with one another.

Preferably, the keypad and display module and the protective window move in a relative direction away from one another in changing from the first operative position to the second operative position.

Preferably, the keypad and display module and the protective window move in a relative direction toward one another in changing from the second operative position to the first operative position.

Preferably, the keypad and display module includes a rack gear along at least one marginal edge portion substantially parallel with the cover lengthwise axis and the protective window includes a rack gear along at least one marginal edge portion in facing relation with the keypad and display module rack gear. A wheel gear is located between the keypad and display module rack gear and the protective window rack gear whereby movement of the protective window in one direction causes movement of the keypad and display module in the opposite direction.

Preferably, a loop wire is coupled to the keypad and display module and to the protective window whereby movement of the protective window in one direction causes movement of the keypad and display module in the opposite direction.

Preferably, the electronic device is a mobile communication device and said keypad comprises a communication keypad.

BRIEF DESCRIPTION OF THE DRAWINGS

Other objects, features and advantages of the pop-up electronic device of the present invention will become readily apparent from the following description of several illustrative embodiments of the pop-up electronic device taken in conjunction with the drawings wherein.

WRITTEN DESCRIPTION OF PREFERRED EMBODIMENTS

Figure 1:
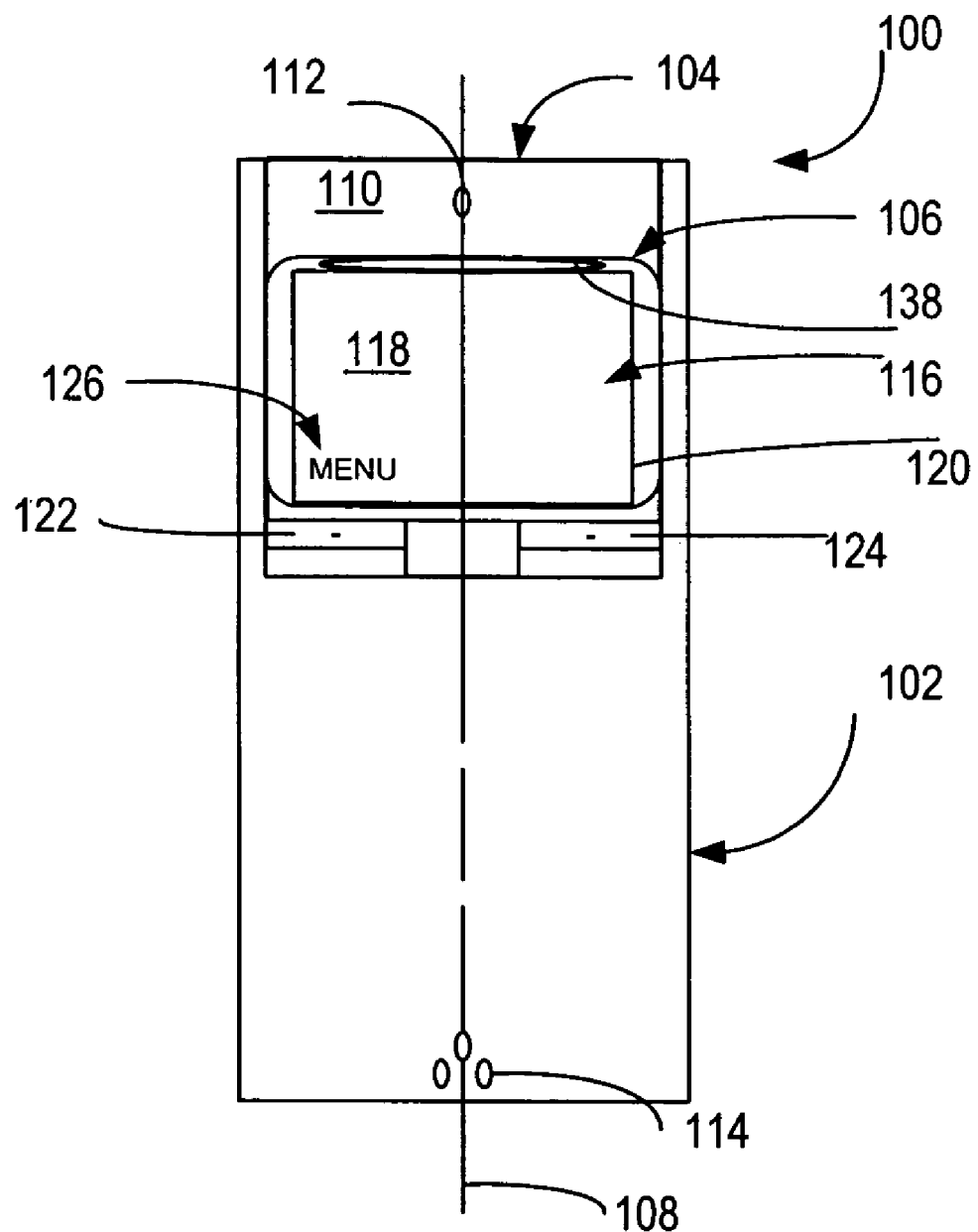
FIG. 1 is a schematic front plan view of a mobile phone embodying the present invention showing the keypad and display module and protective window in the phone closed position.

Turning now to the drawings and considering the invention in further detail, a first illustrative embodiment of the pop-up electronic device of the present invention is illustrated schematically in FIGS. 1–6 as a mobile communication device in the form of a mobile phone. The mobile phone is generally designated 100 and is made up of three major functional components for purposes of explanation. The mobile phone 100 includes an outer cover or enclosure shell generally designated 102, a keypad and display module generally designated 104 and a protective window generally designated 106. The protective window 106 is disposed outermost of the keypad and display module 104. The keypad and display module 104 is arranged for slideable engagement with the outer cover 102 for movement out of and into the outer cover 102 as explained in further detail herein below in a direction along a longitudinal lengthwise axis 108 of the outer cover 102. The protective window 106 is also arranged for slideable engagement with the outer cover 102 for movement in a direction along the longitudinal lengthwise axis 108 of the outer cover and over the major face surface 110 of the keypad and display module 104. The keypad and display module 104 and the protective window 106 are further arranged for movement relative to one another and to the outer cover 102 along a rectilinear path coinciding generally with the longitudinal lengthwise axis 108.

The keypad and display module 104 and the protective window 106 define a first operative or phone fully closed position as illustrated in FIG. 1 wherein the protective window 106 is in an overlapping relationship with the keypad and display module 104. The mobile phone is fully functional in the first operative position to receive and send calls in a conventional ordinary manner wherein the voice or audio is received through the earpiece 112 and speech or audio is spoken into the microphone through the openings 114. In the first operative phone fully closed position, the keypad portion of the keypad and display module 104 nests within the outer cover 102 such that the keys of the keypad are hidden and protected from accidental or deliberate contact and the display portion 116 of the keypad and display module 104 is enveloped by the protective window 106 such that the screen surface 118 of the display 120 is viewable through the protective window 106 and shielded from contact. Graphics, text, or other indicia are viewable on the display surface 118 through the protective window 106. The protective window 106 is made of a suitable material to permit viewing and protection of the display and forming to accommodate the mechanical physical requirements of the phone design and which materials are well known to those skilled in the art. The mobile phone 100 may also include conventional soft keys 122, 124 for selecting corresponding functions which are shown as text or icons 126 in proximity with the soft key associated with the corresponding function.

Soft keys are well known and understood by mobile phone users and those skilled in the art of mobile phones.

The keypad and display module 104 and the protective window 106 are mechanically arranged such that the window 106 is moved in a downward direction indicated by the directional arrow 130 to cause the keypad display module 104 to slide out of or pop-up from the outer cover 102 in the direction indicated by the direction arrow 132. The mechanical arrangement between the keypad and display module 104 and the protective window 106 is such that the keypad and display module is displaced in the direction 132 in unison, ie. contemporaneously with the displacement of the window 106 in the direction 130. In other words, the keypad and display module 104 and the protective window 106 move in a defined displacement and direction relative to one another which displacement may be one-for-one or some other desired displacement for example as discussed in connection with FIGS. 13b and 13c. The protective window 106 is also provided with a finger groove or ridge 138 to allow the user to move the window.

Figure 2:
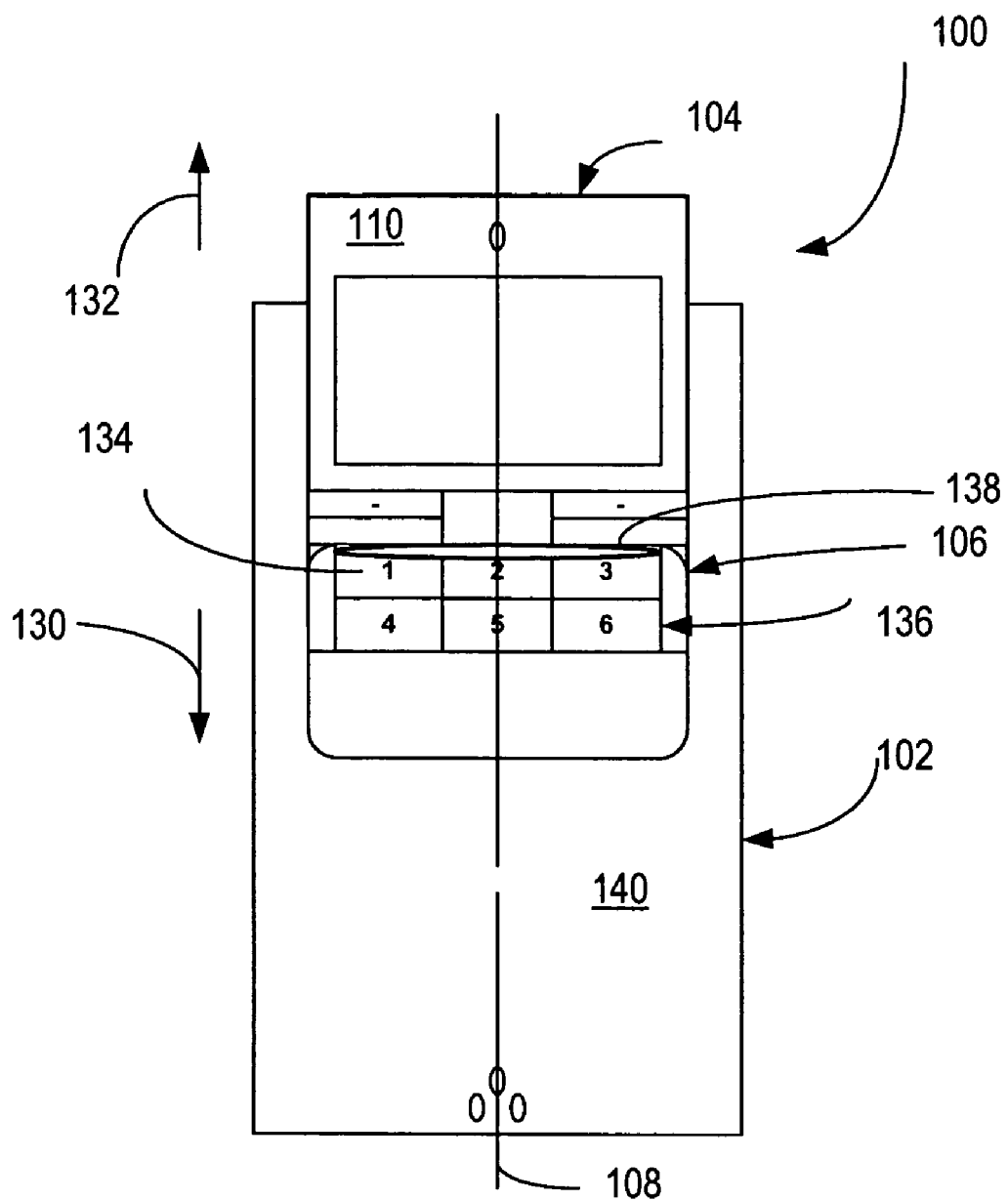
FIG. 2 is a schematic front plan view of the mobile phone of FIG. 1 showing the keypad and display module and protective window in the phone partially open position.
Figure 3:
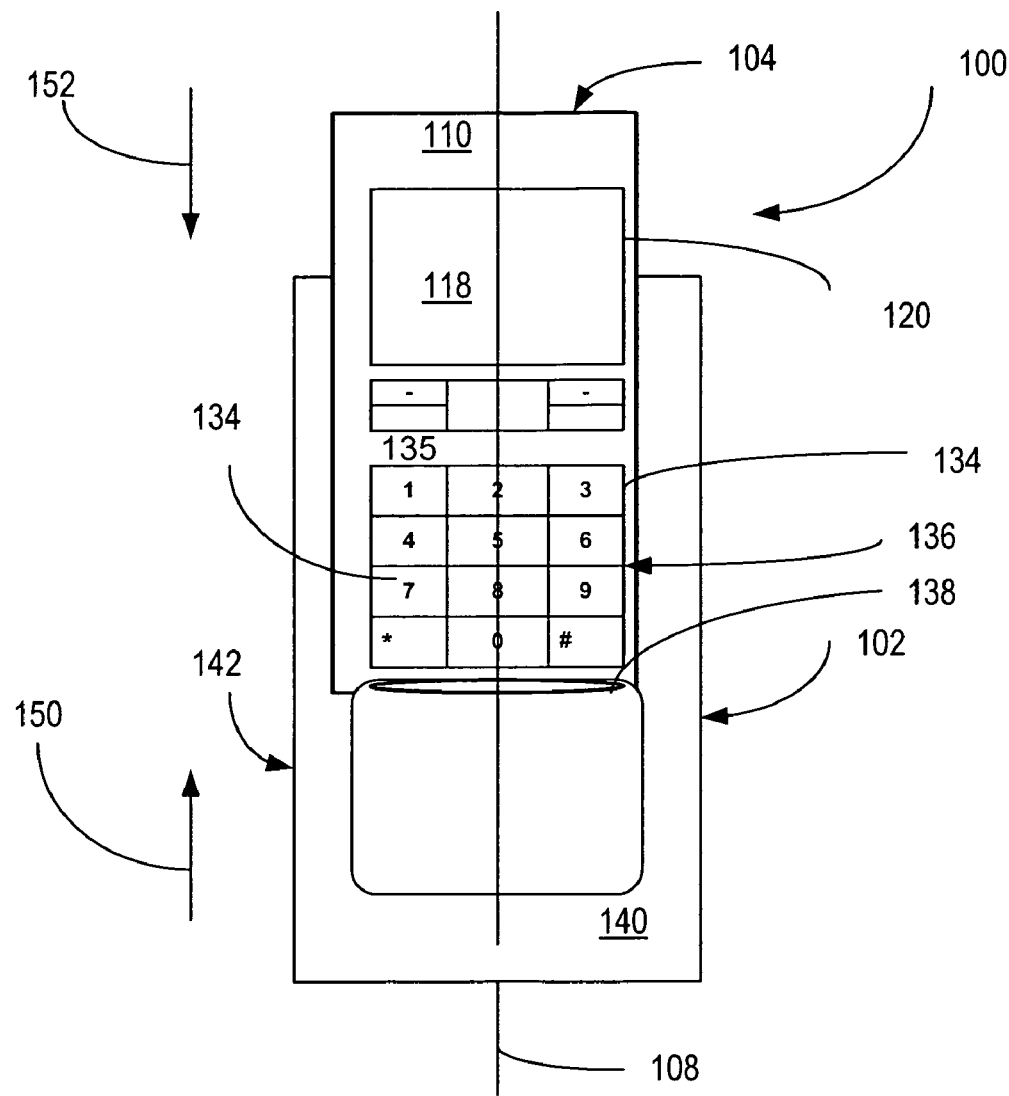
FIG. 3 is a schematic front plan view of the mobile phone of FIG. 1 showing the keypad and display module and the protective window in the phone fully open position.
Figure 4:
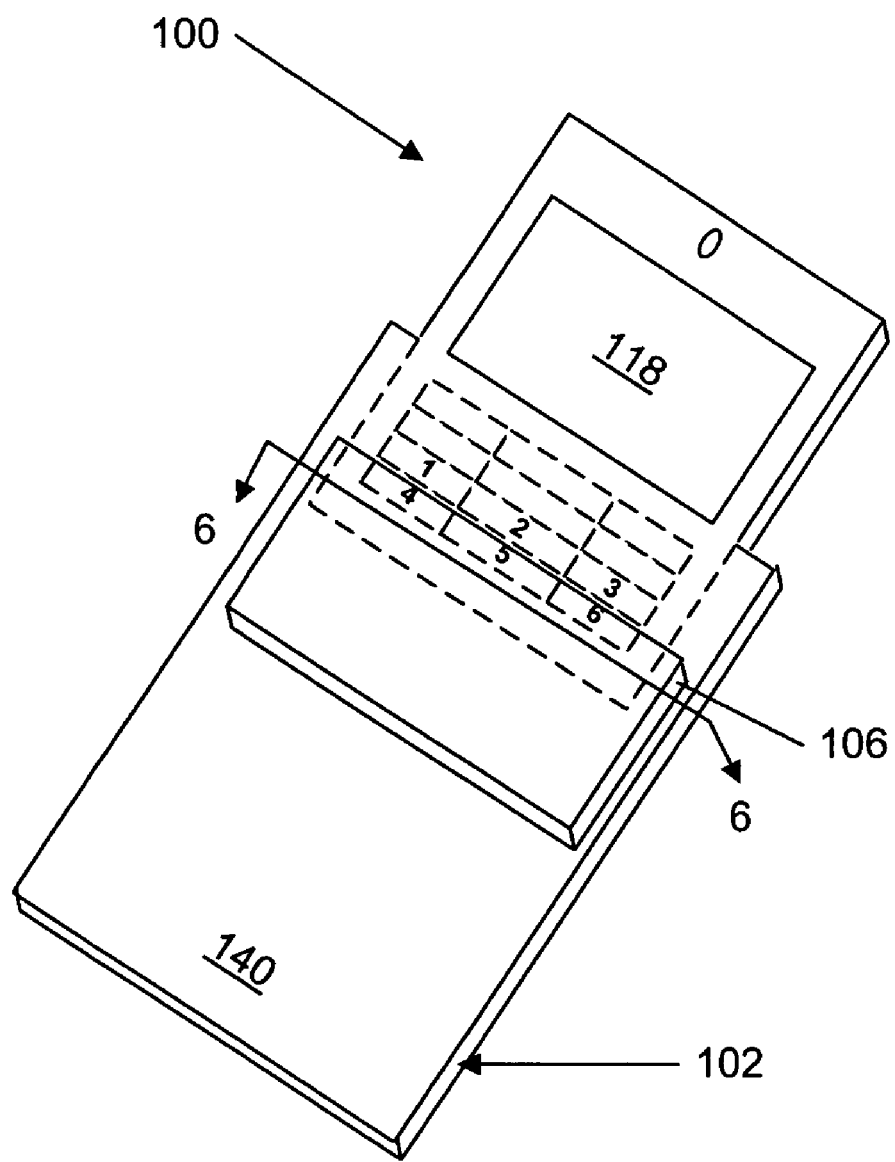
FIG. 4 is a schematic perspective view of the mobile phone shown in FIG. 2 in the phone partially open position.
Figure 5:
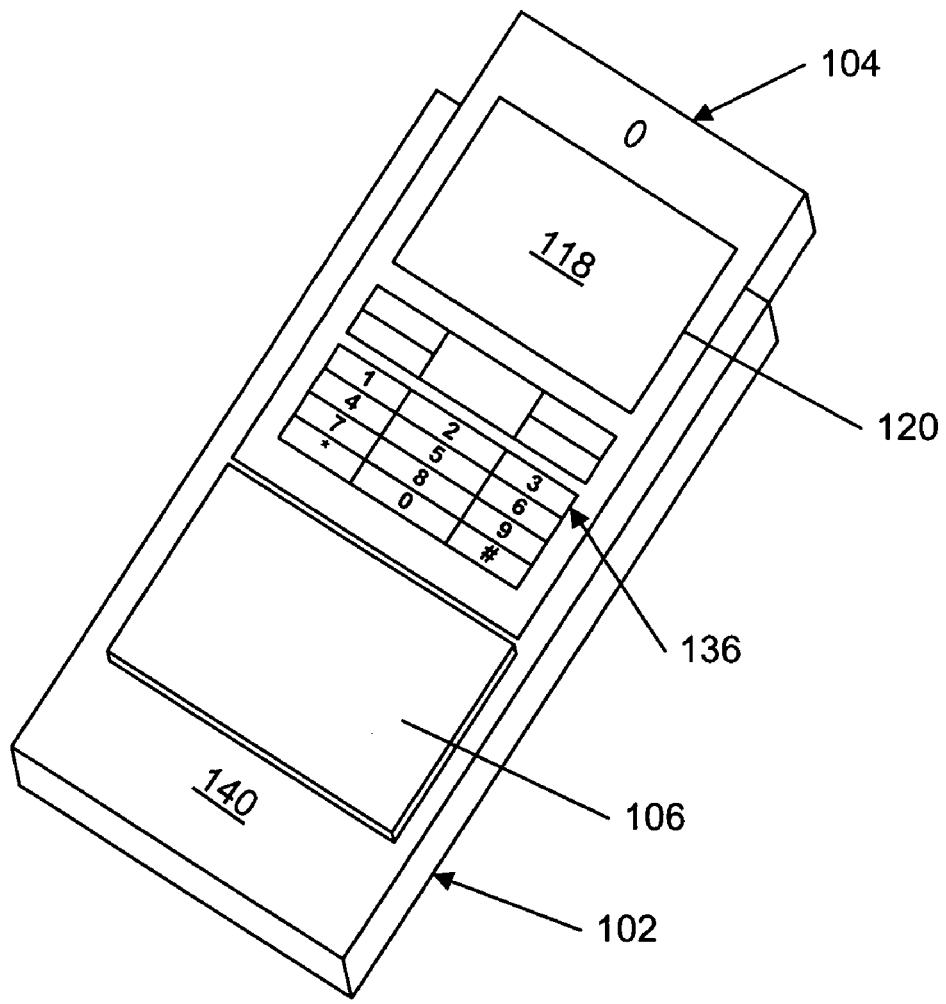
FIG. 5 is a schematic perspective view of the mobile phone shown in FIG. 3 in the phone fully open position.
Figure 6:
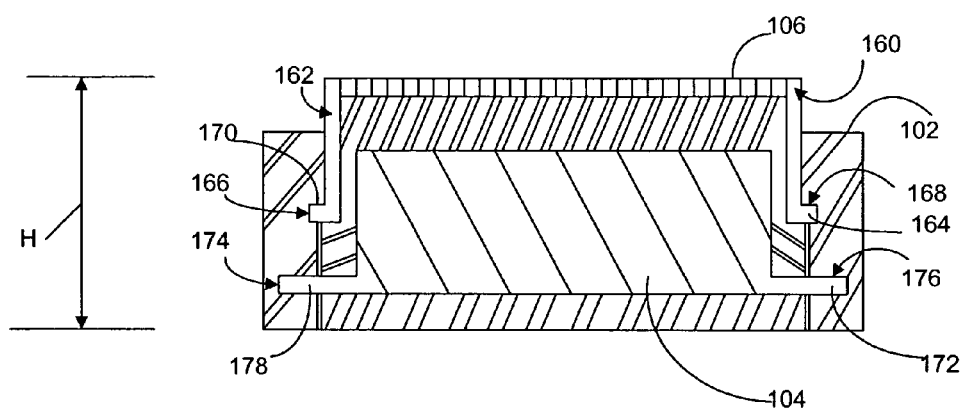
FIG. 6 is a schematic cross-sectional view of the mobile phone taken along the line 6—6 in FIG. 4 showing the protective window outermost the outer cover and keypad and display module.

As illustrated in FIG. 2, the keys 134, 134 of a communication keypad 136 which is constructed on the face 135 of the keypad and display module 104 are revealed and become exposed as the module 104 slides out of the cover 102 in the direction 132 during transition from the first operative phone fully closed position to a second operative phone fully open position wherein the keypad and display module and the protective window are in a non-overlapping relationship with one another and the module 104 is fully extended as illustrated in FIG. 3. In the phone fully open position, the protective window 106 is positioned over the surface 140 in the lower region 142 of the outer cover 102. In the second operative position, the keys 134, 134 of the keypad 136 are fully exposed and accessible for contact and operation. Likewise, the surface 118 of the display 120 is exposed and accessible for contact such as for example, as required by resistive touch screen technology-based displays to carry out desired phone features and functions as well understood by those skilled in the art. In addition, there is no glare from the protective window to interfere with the viewing of the display and any problems with optical parallax between a stylus tip and the display screen surface created by a protective window are eliminated. The mobile phone 100 is returned to its first operative phone fully closed position by pushing the protective window 106 in the direction indicated by the direction arrow 150 which causes the keypad and display module 104 to move in the direction indicated by the direction arrow 152 whereby the protective window 106 and module 104 move toward one another along a rectilinear path coinciding with the longitudinal lengthwise axis 108 of the mobile phone 100 until such time that the mobile phone is in the first operative fully closed position as illustrated in FIG. 1. A cross sectional view of the mobile phone 100 taken along the line 6—6 in FIG. 4 is illustrated in FIG. 6 wherein the outer cover 106 is arranged for movement outermost of the display and keypad module 104 and the outer cover 102. The outer cover 106 includes leg portions 160, 162 extending downwardly and terminating in outwardly facing tabs 164, 166 respectively. The cover 102 includes a longitudinally extending channel 168, 170 along a lengthwise inner wall for receiving the tabs 164, 166 respectively. The protective window 106 is mechanically retained on the outer cover 102 by the tabs 164, 166 sliding in the channels 168, 170 respectively as the window is moved from one operative position to another operative position along the outer surface 140 of the cover 102. The keypad and display module 104 also includes tabs 172, 174 extending outwardly from the module 104 and are received within channels 176, 178 respectively along a lengthwise inner wall in the cover 102 to mechanically retain the module 104 in sliding engagement with the cover 102 for movement relative to the protective window and the cover 102. It will be understood that the movement is limited between the first operative phone fully closed position and the second operative phone fully open position by any suitable means such as stops within the channels and such limiting stops are well know to those skilled in the art.

Figure 9:
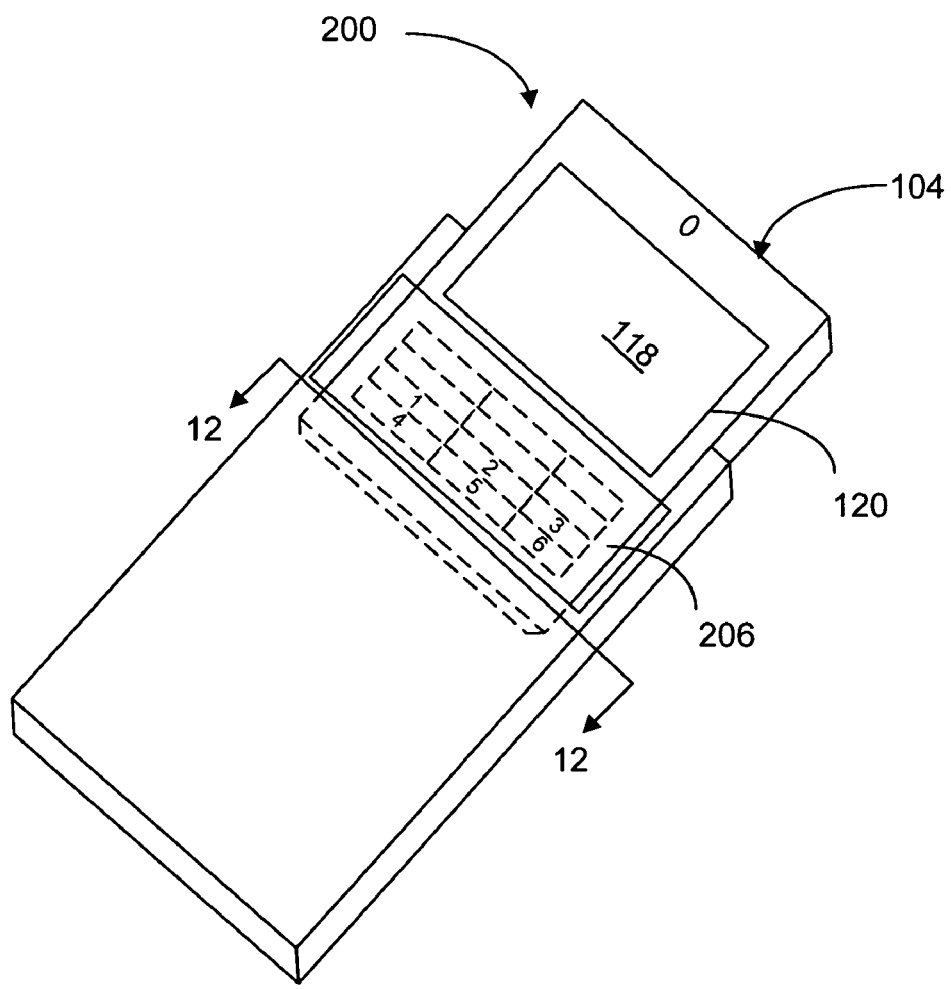
FIG. 9 is a schematic perspective view of the mobile phone shown in FIG. 8 in the phone partially open position.
Figure 10:
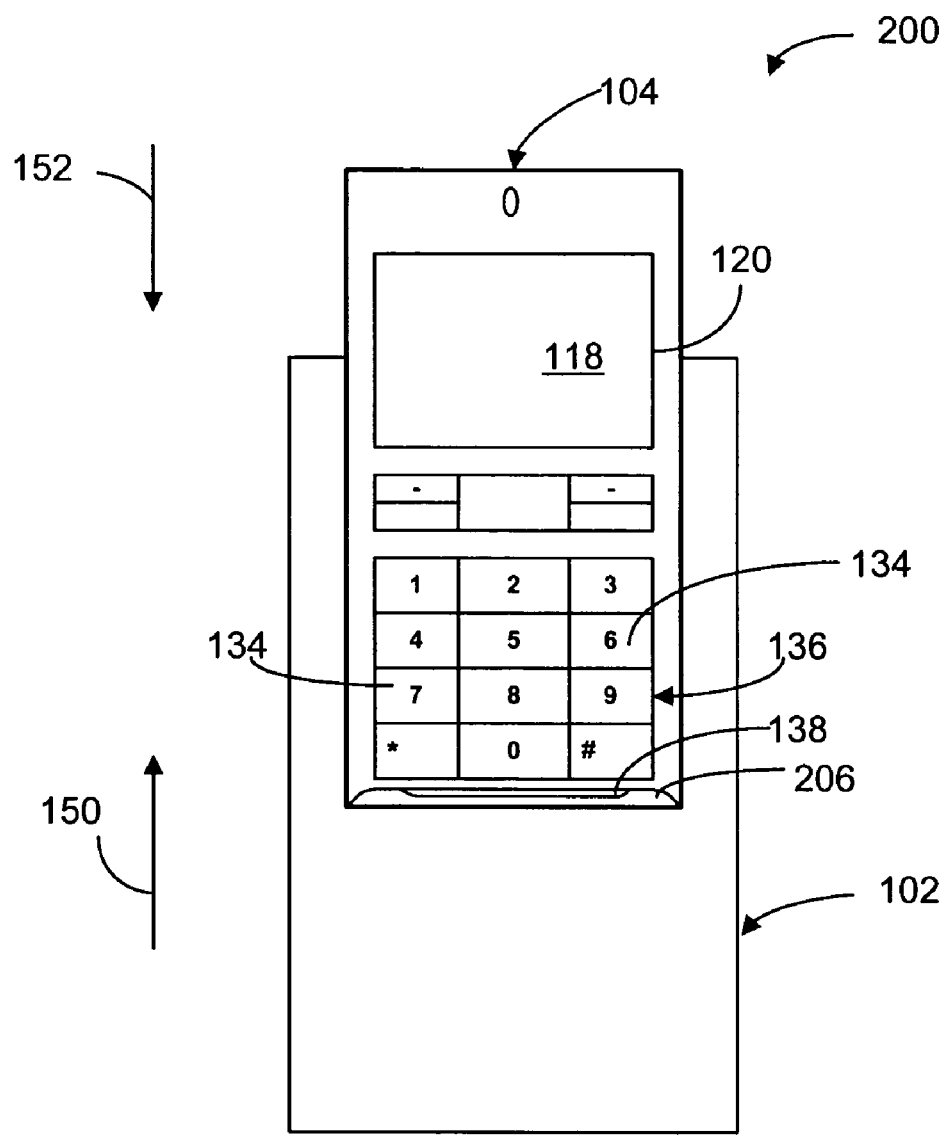
FIG. 10 is a schematic front plan view of the mobile phone of FIG. 7 showing the keypad and display module and the protective window in the phone fully open position.
Figure 11:
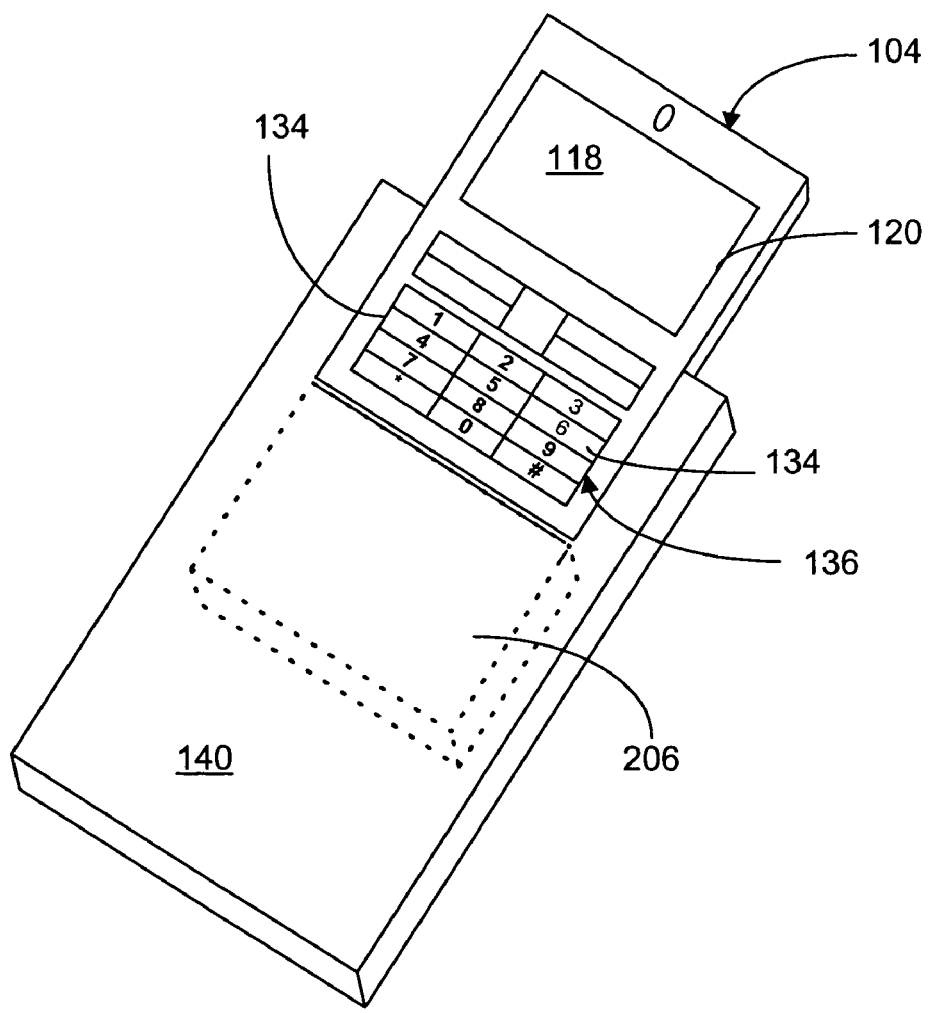
FIG. 11 is a schematic perspective view of the mobile phone shown in FIG. 10 in the phone fully open position.

Turning now to FIGS. 7–12, an alternate embodiment of the pop-up electronic device of the present invention is illustrated therein in the form of a mobile phone and generally designated 200 and is similar in appearance to the mobile phone 100 described in FIGS. 1–6 wherein like reference numerals refer to like parts. In the pop-up mobile phone 200, the protective window 206 is moved downward along the rectilinear path coinciding with the lengthwise axis 108 in the direction of the direction arrow 130 which causes the keypad and display module 104 to move in an opposite direction along the rectilinear path coinciding with the longitudinal axis 108 in the direction indicated by the direction arrow 132. In this embodiment, the protective window 206 is received within the outer cover 102 rather than over the exterior surface 140 of the outer cover 102 as in the embodiment of the mobile phone 100 described above. The protective window 206 substantially nests within the outer cover 102 as illustrated in FIGS. 10 and 11 when the mobile phone is in its second operative phone fully open position. By necessity, the portion forming the finger groove 138 of the protective window 206 remains accessible to allow the user to move the window from its second operative phone fully open position to its first operative phone fully closed position wherein the window is moved in the upward direction indicated by the arrow 150 to cause the keypad and display module 104 to retract into the outer cover 102 in the direction indicated by the direction arrow 152.

Figure 12:
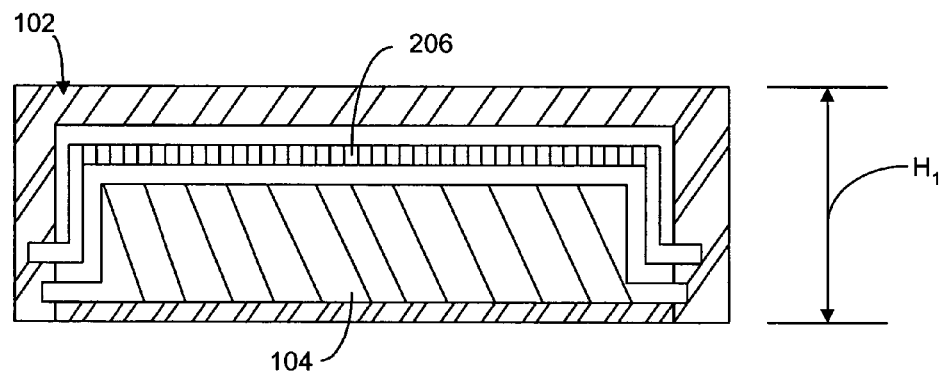
FIG. 12 is a schematic cross-sectional view of the mobile phone taken along the line 12—12 in FIG. 9 showing the protective window nested within the outer cover and over the keypad and display module.
Figure 7:
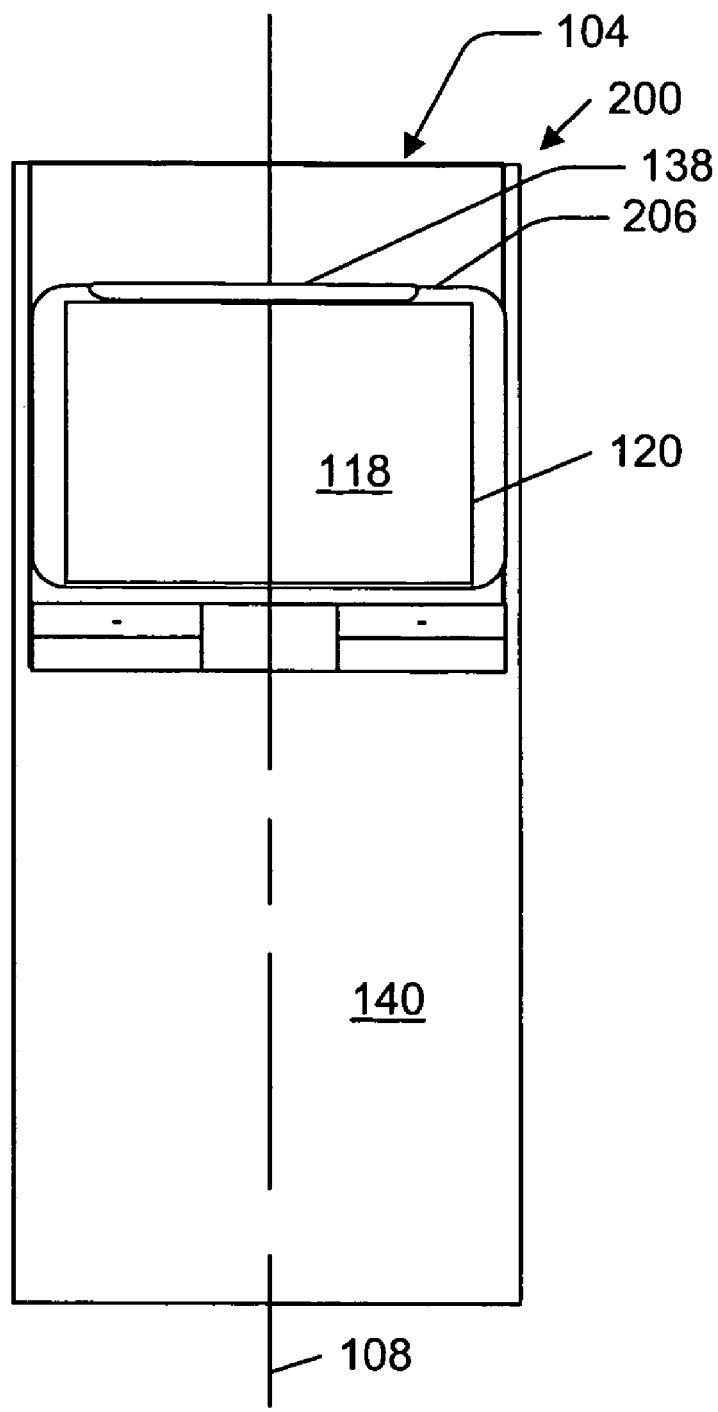
FIG. 7 is a schematic front plan view of an alternate embodiment of the mobile phone of the present invention showing the keypad and display module and protective window in the phone closed position.
Figure 8:
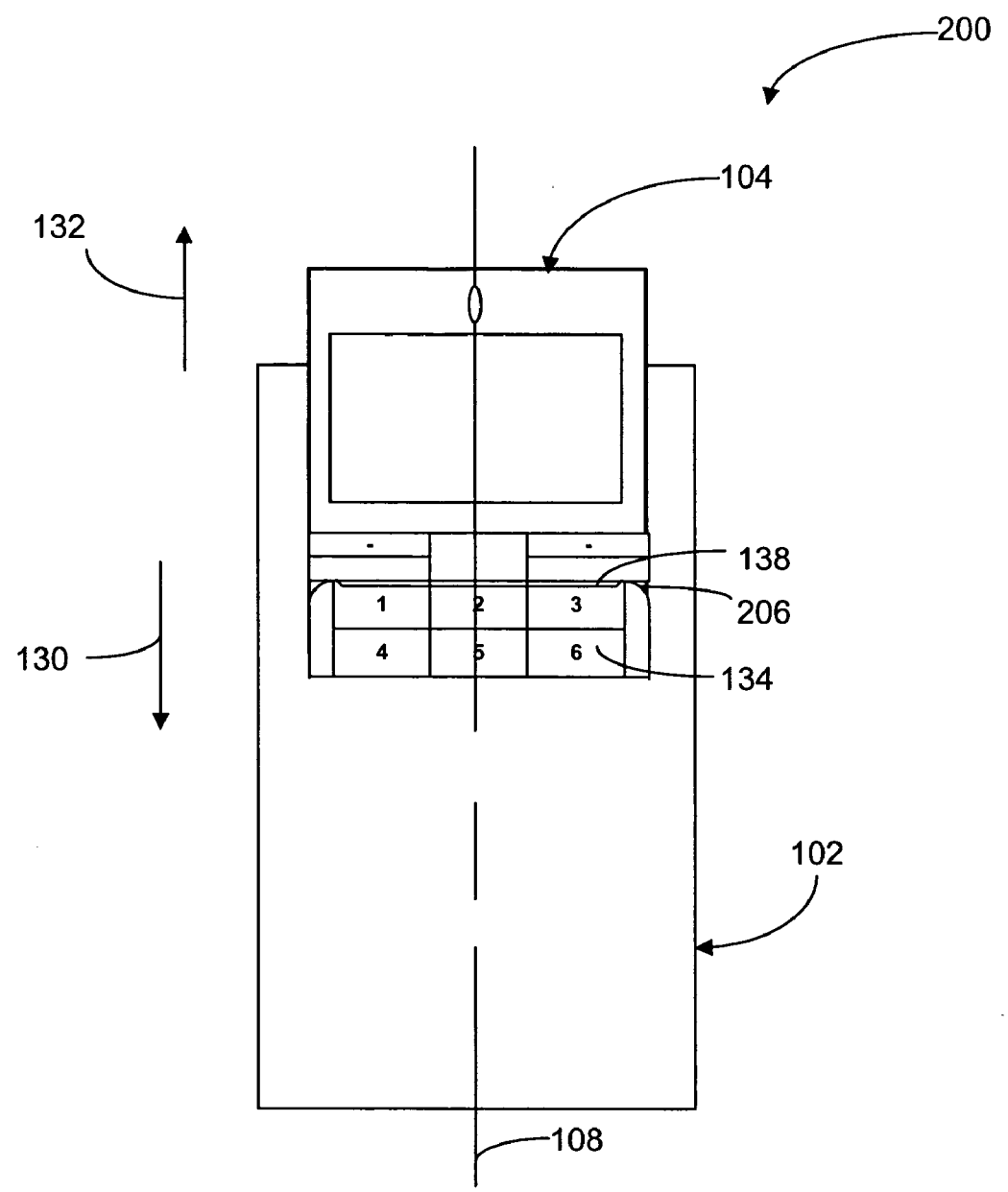
FIG. 8 is a schematic front plan view of the mobile phone of FIG. 7 showing the keypad and display module and protective window in the phone partially open position.

A schematic cross sectional view of the mobile phone 200 taken along the line 12—12 of FIG. 9 is illustrated in FIG. 12 and shows the protective window 206 nested within the outer cover 102 and in overlapping relationship with the keypad and display module 104. The cover 206 and module 104 are arranged for retention and sliding engagement with the cover 102 and with respect to one another utilizing a similar tab and channel arrangement as discussed above in connection with FIG. 6. By necessity, the height profile dimension $H_1$ is larger than the height profile dimension H for the mobile phone 100 to accommodate the protective window 206 when it is slid into the outer cover 102 as illustrated in FIGS. 10 and 11.

Figure 13A:
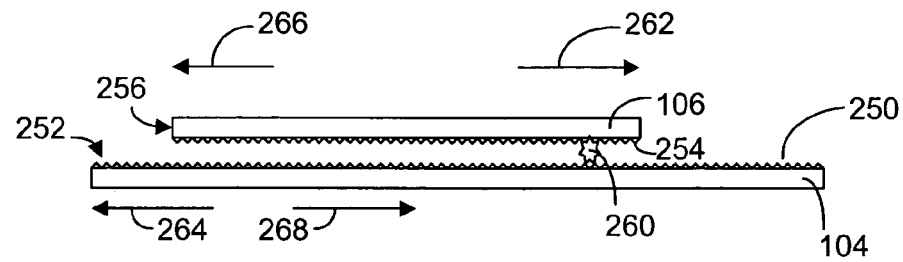
FIG. 13a is a schematic side view of the keypad and display module and protective window arranged with a rack gear and a co-operating wheel gear to provide relative movement of the module and window in unison with one another.

Turning now to FIG. 13a, a schematic side view of the keypad and display module 104 and protective window 106 is illustrated therein wherein the module 104 includes a rack gear 250 along a lengthwise marginal region 252 of the module 104. The protective window 106 also includes a rack gear 254 along a marginal lengthwise region 256 and in facing relationship with the rack gear 250 of the module 204. A wheel gear 260 is located appropriately within the cover 204 and co-acts with the rack gears 250 and 254 such that movement of the protective window 106 in the direction indicated by the direction arrow 262 causes the module 104 to move in the opposite direction indicated by the direction arrow 264. Movement of the protective window 106 in the direction indicated by the direction arrow 266 causes the module 104 to move in the opposite direction indicated by direction arrow 268. It can be seen with the rack gear arrangement illustrated in FIG. 13a, the spacing of the teeth in the respective rack gears 250 and 254 is the same so that relative movement of the protective window 106 a given displacement causes a like displacement of the module 104 in the opposite direction.

Figure 13B:
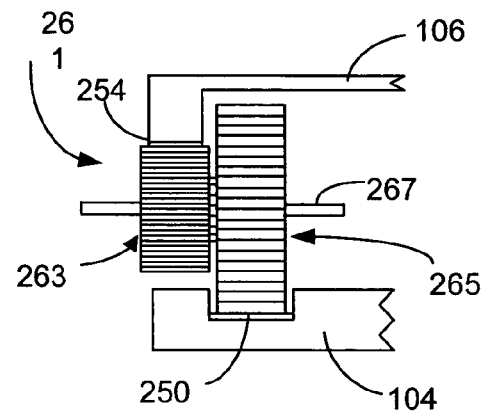
FIG. 13b is a schematic end view of the keypad and display module and protective window arranged with a rack gear and a co-operating sectioned wheel gear to provide greater relative displacement of the module with respect to the window.
Figure 13C:
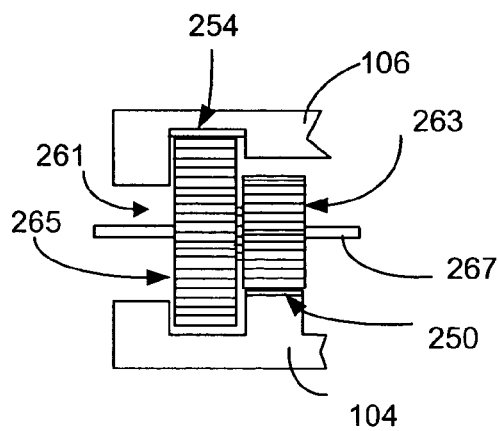
FIG. 13c is a schematic end view of the keypad and display module and protective window arranged with a rack gear and a co-operating sectioned wheel gear to provide greater relative displacement of the window with respect to the module.

The relative displacement distances between the protective window 106 and the module 104 can be other than one-to-one by utilizing wheel gears having appropriately sized diameters as illustrated schematically in FIGS. 13b and 13c. In FIG. 13b, a wheel gear generally designated 261 rotates on a fixed pinion 267 and has a first gear section 263 which co-acts with and drives the rack gear 254 of the protective window 106. A second gear section 265 co-acts with and drives the rack gear 250 of the module 104. As illustrated, the diameter of the first gear section 263 is smaller than the diameter of the second gear section 265 so that the module 104 will move a greater distance than the protective window 106 as the gear wheel 261 rotates due to the larger circumference of the second gear section 265. Likewise, the protective window 106 can be made to move a greater distance than the module 104 by reversing the wheel gear arrangement as illustrated in FIG. 13c wherein the first gear section 263 co-acts with and drives the rack gear 250 of the module 104 and the second gear section 265 which has a larger circumference than the first gear section 263, co-acts with and drives the rack gear 254 of the protective window 106 causing the protective window 106 to move a greater distance than the module 104 as the wheel gear 261 rotates.

It will also be recognized that although the rack gear arrangement is illustrated along one side of the protective window and module, a substantially identical rack gear arrangement may be located along the lengthwise marginal region on the opposite side of the protective window and module.

Figure 14:
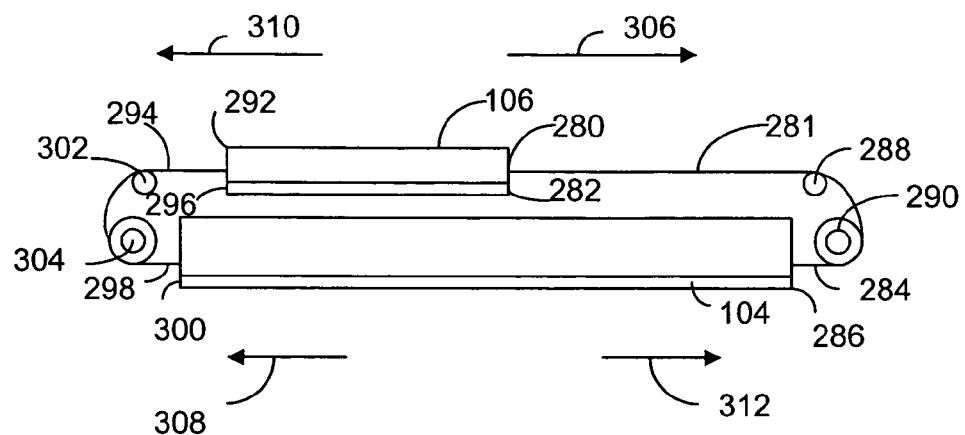
FIG. 14 is a schematic side view of the keypad and display module and protective window arranged with a loop wire to provide relative movement of the module and window in unison with one another.

Turning to FIG. 14, a further arrangement for causing relative movement between the protective window 106 and the module 104 is illustrated schematically therein and comprises a wire loop arrangement to provide the relative movement between the keypad and display module and the protective window in unison with one another. One end 280 of the wire 281 is connected to one end 282 of the protective window 106 and the opposite end 284 of the wire 281 is connected to one end 286 of the module 104 and loops around the pulleys 288 and 290. One end 292 of the wire 294 is attached to the opposite end 296 of the protective window 106 and the opposite end 298 of the wire 294 is attached to one end 300 of the module 104. The wire 294 loops around the pulleys 302 and 304. In this arrangement, movement of the protective window 106 in the direction indicated by the direction arrow 306 causes movement of the module 104 in the direction indicated by the direction arrow 308. Likewise, movement of the protective window in the direction as indicated by the direction arrow 310 causes movement of the module 104 in the opposite direction as indicated by the direction arrow 312. Because there is a direct one-to-one connection, displacement of the protective window 106 in one direction causes an equal displacement of the module 104 in the opposite direction. It will be recognized that the arrangement of the loop wire and pulleys 288, 290, 302 and 304 are located in such a way that no interference is made with the movement of the protective window 106 and module 104.

Figure 15:
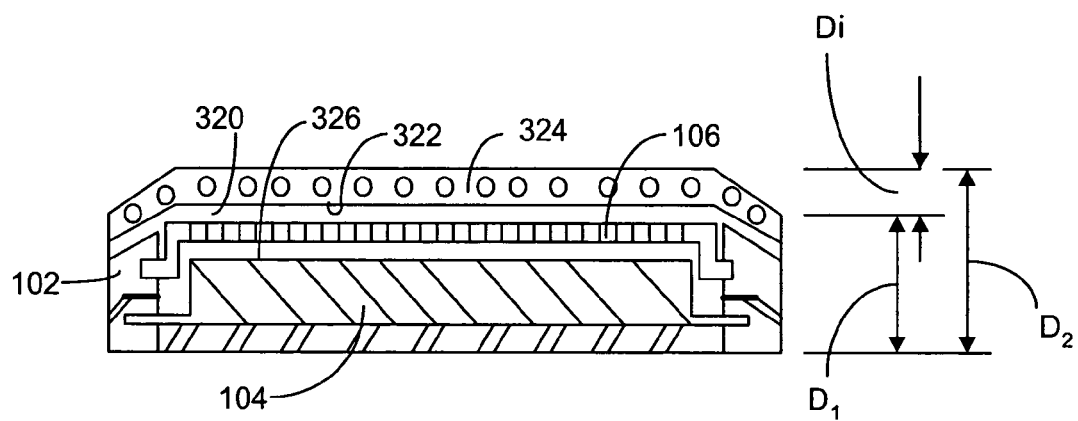
FIG. 15 is a schematic cross-sectional view of a further alternate embodiment of the mobile phone of the present showing a pocket formed of a stretchable material for receiving the protective window in the phone fully open position.

Turning now to FIG. 15, a schematic cross sectional view of a further alternate embodiment of the pop-up electronic device of the present invention is illustrated therein in the form of a mobile phone and is somewhat similar to the arrangement shown in FIG. 12. In the embodiment illustrated in FIG. 15, the surface corresponding to the surface portion 140 of the cover 102 illustrated in the mobile phones 100 and 200 described above, is made of a suitable stretchable material to define a pocket 320 for receiving the protective window when the mobile phone is in the phone fully open position. As illustrated in FIG. 15, the protective window 106 is received within the pocket generally designated 320 defined between the inner surface 322 of the stretchable material 324 and the upper portion 326 of the keypad and display module 104. In this embodiment, the height of the phone has a dimension $D_1$ when the protective window 106 is in the phone fully closed position to present a low profile sleek appearing phone package. When the protective window 106 is moved to the phone fully open position and is received within the pocket 320, the stretchable material 324 is stretched to accommodate the protective window 106 and increases the height dimension of the mobile phone to a phone fully open dimension of $D_2$. Thus the height of the phone changes an incremental dimensional amount equal to the difference between the phone fully closed position and phone fully opened position and is generally designated $D_i$. The stretchable material 324 may be of any suitable material now known or future developed that is stretchable to accommodate displacement for receiving the protective window in the phone fully closed position. The material of the pocket may be sufficiently stiff to provide the cover function or the pocket can lie on the hard cover. The intended function of the material stretching is that the pocket will not waste space in the phone closed position. The pocket could also be of any soft material which allows the pocket to collapse when empty.

A pop-up electronic device in the form of a pop-up mobile communication device such as a mobile phone with a sliding protective window has been described above in several preferred embodiments. Numerous changes and alterations may be made by those skilled in the pop-up electronic device art within the scope of the above written description. Therefore, the invention has been described be way of illustration rather than limitation.

The invention claimed:

1. An electronic device, comprising:
an outer cover;
a keypad and display module arranged for slideable engagement with said outer cover along a longitudinal lengthwise axis of said cover;
a protective window disposed outermost of said keypad and display module and arranged for slideable engagement with said outer cover and along said cover longitudinal lengthwise axis;
said keypad and display module and said protective window further being arranged for movement relative to one another and said cover along a rectilinear path coinciding with said cover longitudinal lengthwise axis, and
said keypad and display module and said protective window defining a first operative device fully closed position wherein said protective window is in overlapping relationship with said keypad and display module and a second operative device fully open position wherein said keypad and display module and said protective window are in a non-overlapping relationship with one another.

2. The electronic device as defined in claim 1 wherein in said first operative device fully closed position the keypad portion of said keypad and display module nests within said outer cover such that the keys of the keypad are hidden and protected from contact and the display portion of said keypad and display module is enveloped by said protective window such that the screen surface of said display is viewable through said protective window and protected from contact.

3. The electronic device as defined in claim 1 wherein in said second operative device fully open position the keypad portion of said keypad and display module is accessible for contact for operating the keys of said keypad.

4. The electronic device as defined in claim 3 wherein in said second operative device fully open position the protective window is located such that a screen surface of said display is exposed for direct viewing and contact.

5. The electronic device as defined in claim 4 wherein said protective window nests within said outer cover.

6. The electronic device as defined in claim 4 wherein said protective window slides over an exterior surface portion of said cover.

7. The electronic device as defined in claim 4 wherein said cover further includes at least a portion of an exterior surface made of a stretchable material defining a pocket for receiving said protective window.

8. The electronic device as defined in claim 1 wherein said keypad and display module and said protective window are further arranged to move in unison with one another.

9. The electronic device as defined in claim 8 wherein said keypad and display module and said protective window move in a direction away from one another from said first operative device fully closed position to said second operative device fully open position.

10. The electronic device as defined in claim 8 wherein said keypad and display module and said protective window move in a direction toward one another from said second operative device fully open position to said first operative device fully closed position.

11. The electronic device as defined in claim 8 wherein said keypad and display module and said protective window are further arranged for different displacement distances along said rectilinear path.

12. The electronic device as defined in claim 11 wherein said keypad and display module move a greater distance than said protective window.

13. The electronic device as defined in claim 11 wherein said protective window moves a greater distance than said keypad and display module.

14. The electronic device as defined in claim 8 further comprising said keypad and display module including a rack gear along at least one marginal edge portion substantially parallel with said cover lengthwise axis, said protective window including a rack gear along at least one marginal edge portion in facing relation with said keypad and display module rack gear and a wheel gear located between said keypad and display module rack gear and said protective window rack gear whereby movement of said protective window in one direction causes movement of said keypad and display module in the opposite direction.

15. The electronic device as defined in claim 8 further comprising a loop wire coupled to said keypad and display module and to said protective window whereby movement of said protective window in one direction causes movement of said keypad and display module in the opposite direction.

16. The electronic device as defined in claim 1 wherein said device is a mobile communication device and said keypad comprises a communication keypad constructed on the face of said keypad and display module.

17. A mobile communication device, comprising:
an outer cover;
a keypad and display module arranged for slideable engagement with said outer cover along a longitudinal lengthwise axis of said cover wherein said keypad comprises a communication keypad constructed on the face of said keypad and display module;
a protective window disposed outermost of said keypad and display module and arranged for slideable engagement with said outer cover and along said cover longitudinal lengthwise axis;
said keypad and display module and said protective window further being arranged for movement relative to one another and said cover along a rectilinear path coinciding with said cover longitudinal lengthwise axis, and
said keypad and display module and said protective window defining a first operative device fully closed position wherein said protective window is in overlapping relationship with said keypad and display module and a second operative device fully open position wherein said keypad and display module and said protective window are in a non-overlapping relationship with one another, said keypad being exposed for operative use in the fully open position.

18. The mobile communication device as defined in claim 17 wherein in said first operative device fully closed position the keypad portion of said keypad and display module nests within said outer cover such that the keys of the keypad are hidden and protected from contact and the display portion of said keypad and display module is enveloped by said protective window such that the screen surface of said display is viewable through said protective window and protected from contact.

19. The mobile communication device as defined in claim 17 wherein in said second operative device fully open position the keypad portion of said keypad and display module is accessible for contact for operating the keys of said keypad.

20. The mobile communication device as defined in claim 19 wherein in said second operative device fully open position the protective window is located such that the screen surface of said display is exposed for direct viewing and contact.

21. The mobile communication device as defined in claim 20 wherein said protective window nests within said outer cover.

22. The mobile communication device as defined in claim 20 wherein said protective window slides over an exterior surface portion of said cover.

23. The mobile communication device as defined in claim 20 wherein said cover further includes at least a portion of an exterior surface made of a stretchable material defining a pocket for receiving said protective window.

24. The mobile communication device as defined in claim 20 wherein said cover further includes a stretchable material laying over at least a portion of an exterior surface and defining a pocket for receiving said protective window.

25. The mobile communication device as defined in claim 17 wherein said keypad and display module and said protective window are further arranged to move in unison with one another.

26. The mobile communication device as defined in claim 25 wherein said keypad and display module and said protective window move in a direction away from one another from said first operative device fully closed position to said second operative device fully open position.

27. The mobile communication device as defined in claim 25 wherein said keypad and display module and said protective window move in a direction toward one another from said second operative device fully open position to said first operative device fully closed position.

28. The mobile communication device as defined in claim 25 wherein said keypad and display module and said protective window are further arranged for different displacement distances along said rectilinear path.

29. The mobile communication device as claimed in claim 28 wherein said keypad and display module moves a greater distance than said protective window.

30. The mobile communication device as claimed in claim 28 wherein said protective window moves a greater distance than said keypad and display module.

31. The mobile communication device as defined in claim 25 further comprising said keypad and display module including a rack gear along at least one marginal edge portion substantially parallel with said cover lengthwise axis, said protective window including a rack gear along at least one marginal edge portion in facing relation with said keypad and display module rack gear and a wheel gear located between said keypad and display module rack gear and said protective window rack gear whereby movement of said protective window in one direction causes movement of said keypad and display module in the opposite direction.

32. The mobile communication device as defined in claim 25 further comprising a loop wire coupled to said keypad and display module and to said protective window whereby movement of said protective window in one direction causes movement of said keypad and display module in the opposite direction.

* * * * *